US006412826B1

(12) United States Patent
Kulevsky et al.

(10) Patent No.: US 6,412,826 B1
(45) Date of Patent: Jul. 2, 2002

(54) HIGH PRESSURE QUICK CONNECTOR

(75) Inventors: Jonathan Kulevsky, Clinton Township; George Szabo, Ortonville; Timothy Jackson, Orion, all of MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/293,094

(22) Filed: Apr. 16, 1999

(51) Int. Cl.⁷ .................................................. F16L 35/00
(52) U.S. Cl. ........................ 285/305; 285/39; 285/81; 285/340; 285/319; 285/322
(58) Field of Search ............................ 285/39, 81, 319, 285/340, 305, 322, 323

(56) References Cited

U.S. PATENT DOCUMENTS

| | | |
|---|---|---|
| 2,749,151 A | 6/1956 | Lyons |
| 3,127,199 A | 3/1964 | Roe |
| 3,278,206 A | 10/1966 | Woodling |
| 3,404,904 A | 10/1968 | Roe |
| 3,534,988 A | 10/1970 | Lindsey |
| 3,786,730 A | 1/1974 | Linderholm |
| 4,401,326 A | 8/1983 | Blair |
| 4,423,891 A | 1/1984 | Menges |
| 4,598,937 A | 7/1986 | Sugao |
| 4,610,468 A * | 9/1986 | Wood ........................ 285/81 |
| 4,725,081 A | 2/1988 | Bauer |
| 4,778,203 A * | 10/1988 | Bartholomew .............. 285/319 |
| 4,793,637 A * | 12/1988 | Laipply et al. ............. 285/319 |
| 4,893,657 A | 1/1990 | Usui |
| 5,042,848 A * | 8/1991 | Shiozaki ..................... 285/323 |
| 5,064,227 A * | 11/1991 | Spors et al. ................ 285/319 |
| 5,178,424 A | 1/1993 | Klinger |
| 5,207,462 A | 5/1993 | Bartholomew |
| 5,257,833 A * | 11/1993 | McNaughton et al. ...... 285/319 |
| 5,275,443 A | 1/1994 | Klinger |
| 5,275,448 A | 1/1994 | McNaughton et al. |
| 5,284,369 A * | 2/1994 | Kitamura .................... 285/322 |
| 5,335,411 A | 8/1994 | Muller et al. |
| 5,342,095 A | 8/1994 | Klinger et al. |
| 5,374,089 A | 12/1994 | Davie et al. |
| 5,378,025 A | 1/1995 | Szabo |
| 5,415,443 A | 5/1995 | Hayashi |
| 5,489,125 A * | 2/1996 | Hohmann .................... 285/81 |
| 5,542,712 A | 8/1996 | Klinger et al. |
| 5,593,188 A * | 1/1997 | McNaughton et al. ...... 285/319 |
| 5,711,549 A | 1/1998 | Beans |
| 5,718,459 A | 2/1998 | Davie et al. |
| 6,065,779 A * | 5/2000 | Moner et al. ................ 285/323 |
| 6,145,887 A * | 11/2000 | Cambot-Courrau .......... 285/81 |
| 6,173,994 B1 * | 1/2001 | Ketcham ..................... 285/81 |

FOREIGN PATENT DOCUMENTS

| | | |
|---|---|---|
| AU | 233336 | 5/1964 |
| DE | 2143714 | 3/1973 |
| DE | 3416702 | 11/1985 |
| DE | 3739626 | 6/1989 |
| DE | 9305916 | 7/1993 |
| DE | 4427597 | 2/1996 |
| DE | 4427598 | 2/1996 |
| EP | 0275815 | 7/1988 |
| FR | 2346628 | 10/1977 |
| GB | 170337 | 10/1921 |

* cited by examiner

Primary Examiner—Eric K. Nicholson
(74) Attorney, Agent, or Firm—Young & Basile, P.C.

(57) ABSTRACT

A quick connector for connecting fluid lines includes a first connector having a housing for receiving a tube carrying spool. The spool sealingly engages an endform on the tube to form a metal-to-metal seal. A retainer in the form of ring having a plurality of angularly and radially extending, resilient legs extending therefrom and terminating in end pads is mountable in the housing in engagement with the spool with the end pads disposed in an annular, inward facing channel in the housing. A pop top is slidable along the tube to bias the retainer legs radially inward to allow insertion of the retainer into the bore in the housing and then is removed to allow the legs to snap radially outward bringing the end pads into engagement with housing channel. An assurance clip is mountable interiorly between the legs of the retainer and the spool to maintain the retainer legs in a radially outward position in engagement with the channel in the housing.

22 Claims, 4 Drawing Sheets

HIGH PRESSURE QUICK CONNECTOR

BACKGROUND OF THE INVENTION

1. Field of the Invention

The present invention relates, in general, to high pressure snap fit or quick connectors employed on fluid conduit systems and, more particularly, high pressure quick connectors employed on vehicle brake lines.

2. Description of the Art

Snap fit or quick connectors have been found to be useful in a wide range of applications. In particular, they are frequently employed for joining fluid carrying conduits in automotive and industrial applications. Such connectors have found general acceptance as they are typically capable of being closed in a single uni-axial movement which facilitates automated assembly, and entail simple designs which are relatively inexpensive to produce.

A further advantage of quick connect fittings is that they provide an effective seal for handling volatile or hazardous fluids, such as gasoline, while permitting ease of disassembly and reassembly during repair of a host system.

In applications where hazardous material is to flow through a fitting, for example, in vehicle brake lines, prevention of inadvertent release of the quick connector is of primary concern. Accordingly, relatively high axial pull apart strength specifications are mandated. In addition, low insertion forces are required.

Currently, for many high pressure applications, such as with brake lines, threaded fittings are used as connection means. If not aligned correctly, cross threading may result. If excessive torque is applied, over threading may result. As a result of cross-threading or overthreading, the threads are stripped and the material must be scrapped and replaced.

In current anti-lock brake systems, the brake lines are connected to a brake manifold or junction during the assembly process of the vehicle. The threaded connections of the prior art are located close together which increases assembly time and labor as well as the potential for error.

A further disadvantage typical of prior art high pressure quick connectors is that they must be assembled with an associated tube and shipped to a final destination as a single assembly. Such shipment is expensive and subjects the connectors to damage from mishandling.

Further, such quick connector designs frequently require the presence of a resilient seal between the outer peripheral surface of the tube and a mating bore which can result in leakage. This is a particular problem with multi-layer, high pressure steel tube typically used in automotive brake lines. Finally, it is difficult to perform in-process leak checks prior to final installation and very expensive to correct leaks after final installation.

One attempt by the present Assignee to alleviate these shortcomings is shown in U.S. Pat. No. 5,711,549. This high pressure quick connector is in the form of a housing, and a tube retainer with a lower cylindrical portion sealingly engaging a flared end form of a tube. A pop top and snap ring are inserted into a bore in the housing until the pop top contacts the end of the housing. This causes the top to slide up and out and releases the snap ring ears into a groove in the housing to lock the snap ring, the retainer and the tube in the housing.

While this type of quick connector meets the requirements of providing a high pull out force and low insertion force, there still exists difficulties in achieving reliable insertion of the snap ring into the grooves and the housing.

Therefore, it is desirable of the invention to provide a quick connect for high pressure automotive system applications an particularly for brake systems which facilitate assembly of the quick connect so that it is easier and quicker. It is also desirable to provide a quick connector for high pressure fluids that provides high axial pull apart strength and low insertion force specifications. It is further desirable to provide a connector that eliminates the threaded connection to reduce scrap as a result of cross-threading. It is also desirable to provide a quick connector for high pressure fluids that has improved reliability in securely inserting the retainer in the housing.

SUMMARY OF THE INVENTION

The present invention is a quick connector which overcomes many of the shortcomings of previously devised quick connectors by providing easy and reliable insertion and secure mounting of a retainer into a quick connector housing.

In one embodiment, the present invention is a quick connector which includes a fluid carrying tube, a first connector having a housing with a bore extending therethrough and an annular inward facing channel spaced from one end of the housing and opening to the bore, a second connector including a spool having a bore extending therethrough for receiving a tube, and a retainer having an aperture in an end portion for receiving the tube therethrough and a plurality of legs movably extending from the end portion for latching engagement in the channel to lockingly couple the spool and tube in sealing engagement with the first connector.

Means are also provided about the tube and movable along the tube, for moving the legs between a radially inward position allowing passage of the legs into the bore in the first connector housing and a radially outward expanded position wherein ends of the legs engage the channel in the housing.

Preferably, the legs have planar ends engageable with the channel. The planar ends of the legs extend outward from side edges of the legs. The legs extend radially outward from one end portion to outer ends. The outer ends of the legs are at a nominal diameter greater than the inner diameter of the bore in the housing.

The legs may have end pads engageable with the channel. Each of the pads preferably have an arcuately shape with opposed ends circumferentially spaced from the ends of adjacent end pads.

Further, the quick connector of the present invention includes means, engageable with the retainer after the retainer has been coupled to the housing, for maintaining the legs of the retainer in radially outward engagement with the channel. The maintaining means is in the form of a clip means, insertable between the legs of the retainer and the spool, for maintaining the legs in a radially outward position with respect to the spool. The clip means is preferably a U-shaped clip having two spaced legs joined by an end wall. Each leg is insertable through two aligned openings formed between the legs of the retainer and the spool. Outwardly extending hooks are formed at the ends of each of the two spaced legs to prevent disengagement of the clip from the retainer. A stop means is formed on the legs for limiting the insertion distance of the clip into the retainer.

The quick connector of the present invention uniquely assures easy mountability and insertion reliability of mounting the retainer in the bore of a female connector. This provides an improvement in ease and reliability over previously devised male to female endform connectors. Further, the use of the unique assurance clip ensures that the retainer legs remain engaged with the channel in the housing to lock the retainer in place.

BRIEF DESCRIPTION OF THE DRAWING

The various features, advantages and uses of the present invention will become more apparent by referring to the following detailed description and drawing in which.

DESCRIPTION OF THE PREFERRED EMBODIMENTS

Figure 1:
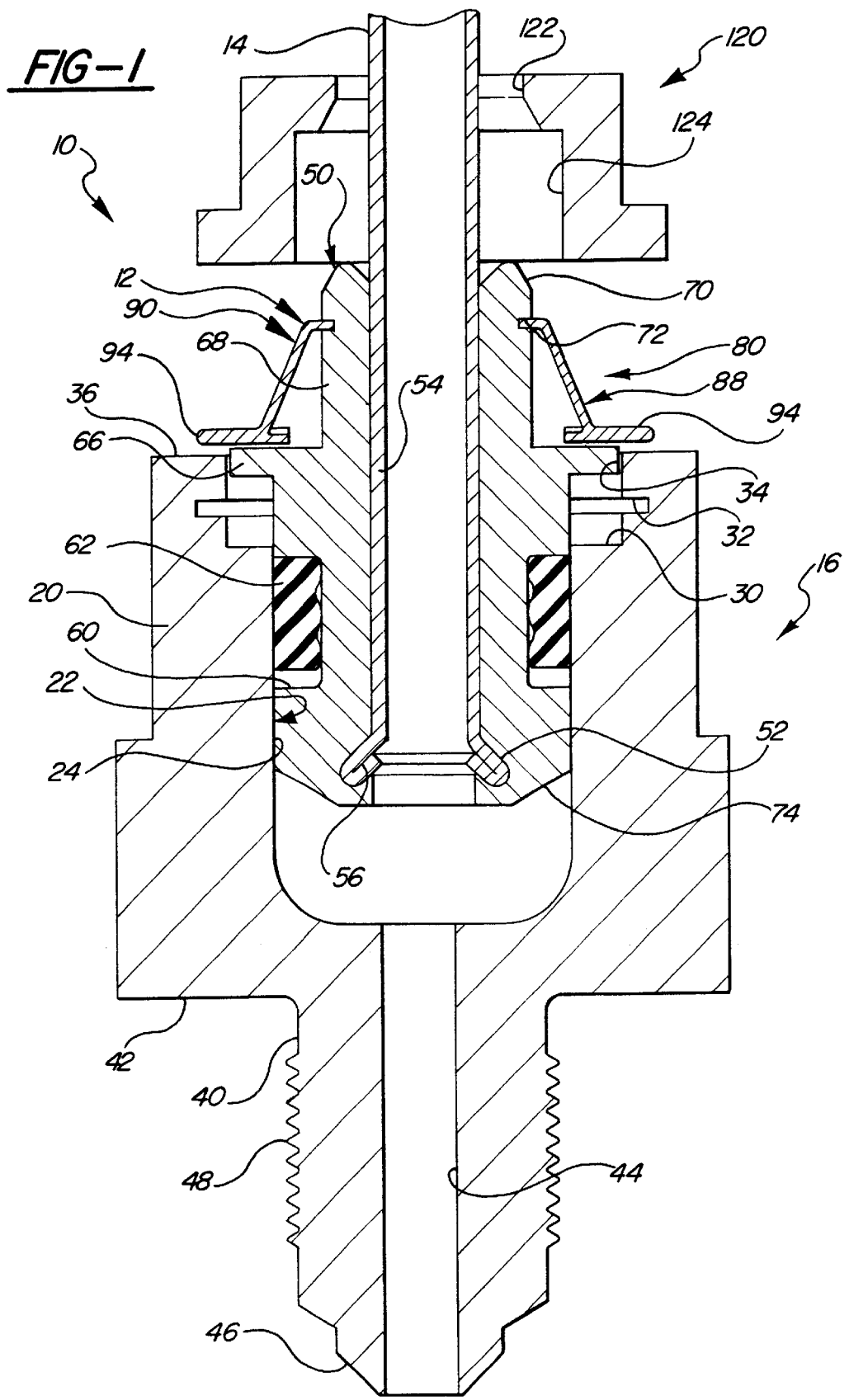
FIG. 1 is a longitudinal cross-sectional view of a quick connector according to the present invention depicted in a partially assembled position.
Figure 2:
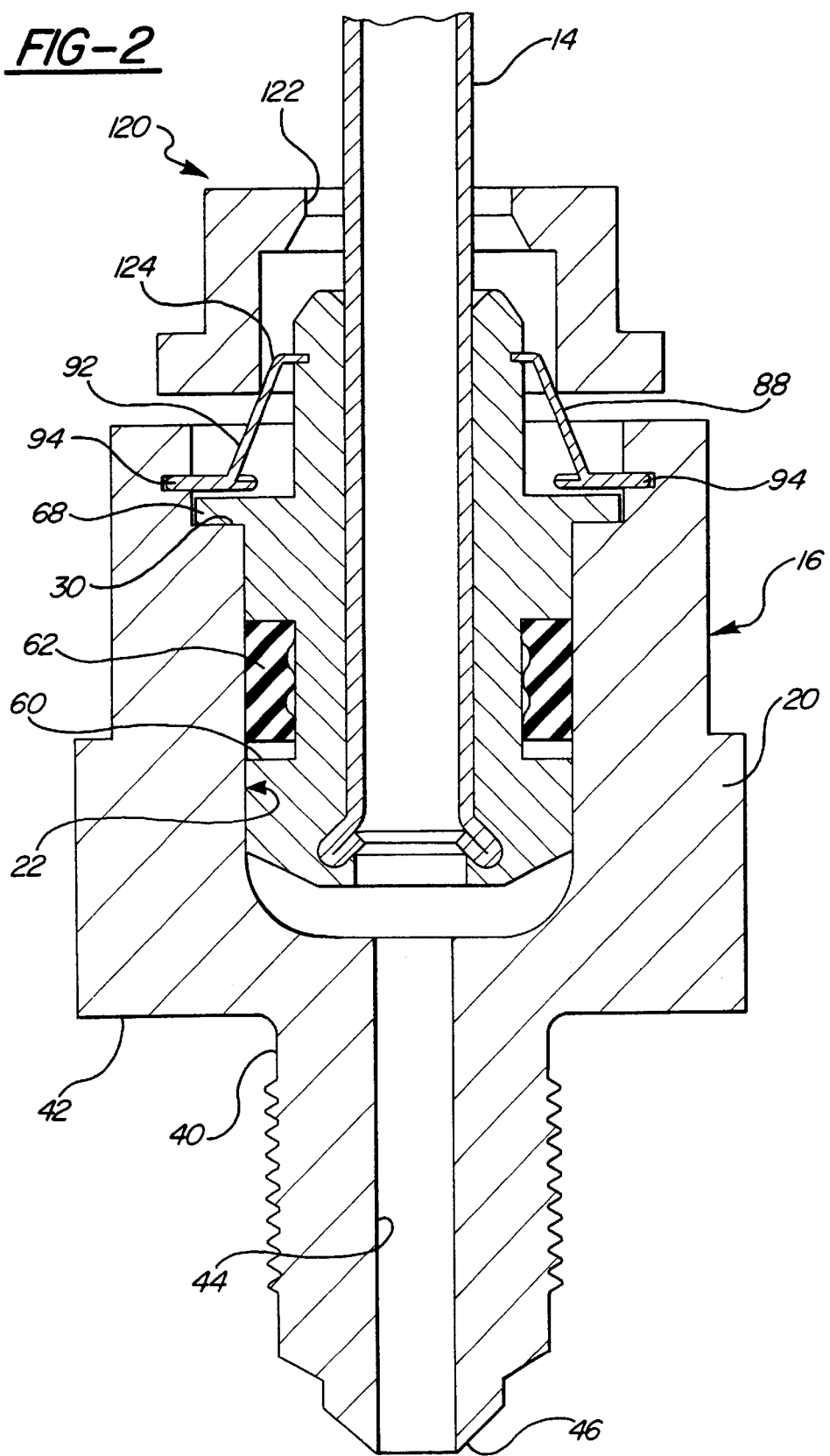
FIG. 2 is a longitudinal cross-sectional view of the quick connector depicted in FIG. 1 shown in a fully assembled position.

Referring now to the drawings, to FIGS. 1 and 2 in particular, there is depicted a quick connector 10 including a male connector adapted for connecting a tube or conduit 14, such as a brake line tube, to a component or female connector 16.

The component or female connector 16 may have any applicable exterior configuration depending upon the application. FIG. 1 depicts a housing 20 for receiving an in-line brake tube 14. The housing 20 has an internal surface defining a receiving bore 22. The external configuration of the housing 20 may change relative to the application. In an anti-lock brake system, brake lines may be connected to a housing in the form of a brake manifold or junction having multiple receiving bores 22 therein. Further, the first or male connector 12 and the housing 20 are not limited to anti-lock brake systems, but may be used for any high pressure connection.

The bore 22 in the housing 20 is formed with a first, intermediate bore portion 24 of a first diameter. A shoulder 30 is formed at the one end of the first intermediate bore portion 24. The shoulder 30 extends radially outward from the inner surface of the first bore portion 24 and merges into an annular, radially outward extending groove 32. The groove 32 is disposed adjacent to an end bore portion 34 which opens to the first end 36 of the housing 20.

In an exemplary embodiment, an elongated tubular shank 40 extends from a second end 42 of the housing 20. A bore 44 extends through the tubular shank 40 to an exterior end 46 of the shank 40 and is disposed in fluid communication with the bore 22. External threads 48 are depicted in FIG. 1 on the shank 40 for connecting the housing 20 to another component, not shown. It will be understood that the shank 40 may be formed without the threads and provided with an outer diameter for an interference fit with a bore in an external component, not shown. Alternately, the housing 20 may be integrally formed with another component without the shank 40.

Figure 6:
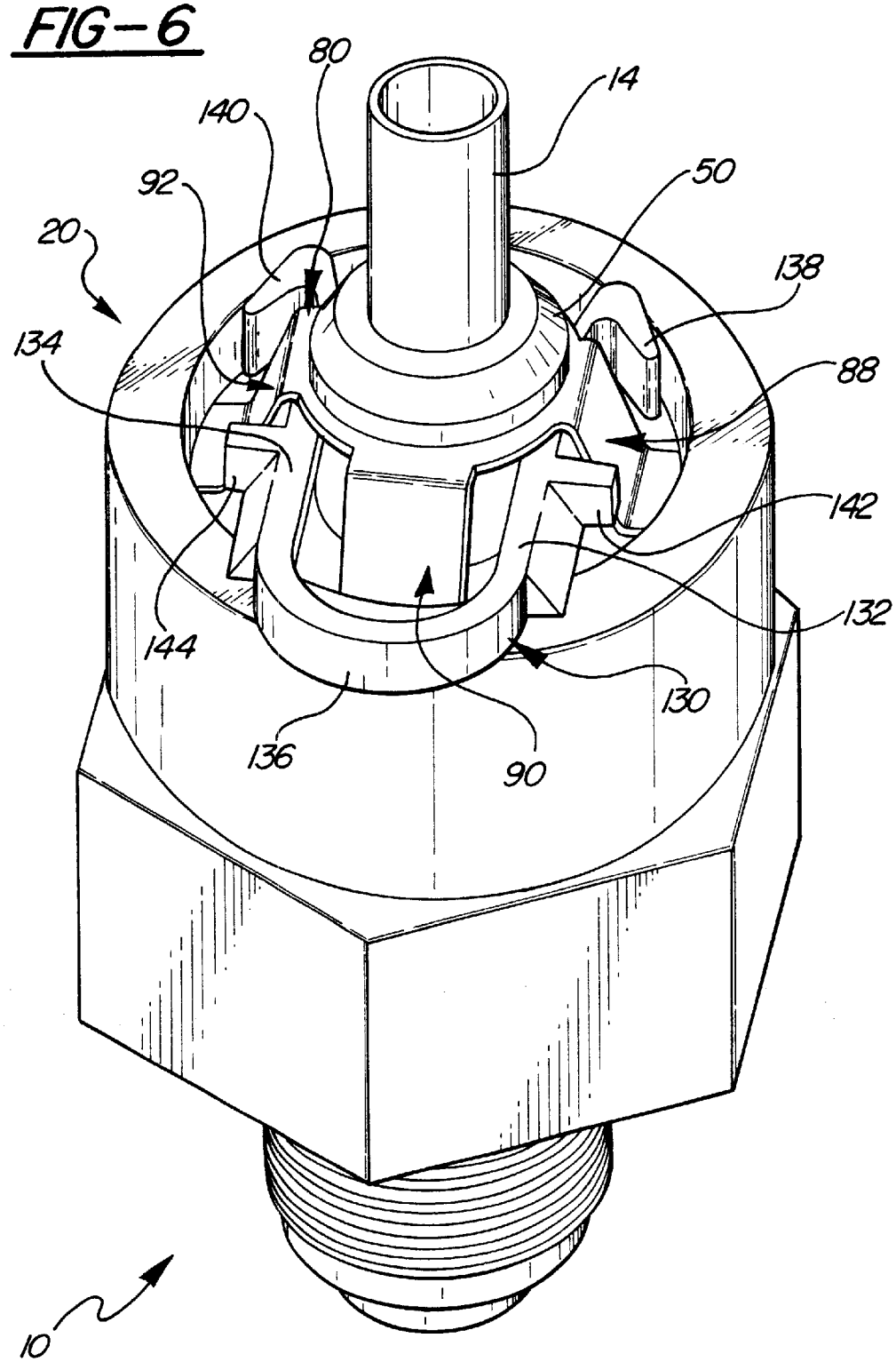
FIG. 6 is a perspective end view of the assembled retainer, assurance clip, tube and female connector.

As shown in FIGS. 1, 2, and 6, a tube retainer or spool 50 positively engages a flared end or end form 52 at one end of the tube 14. The spool 50 is generally in the form of a cylindrical body having a through bore 54 extending between opposed ends. The bore 54 has a generally constant diameter first section which merges at one end with a conical radially outward extending seat 56. The conical surface 56 is formed complimentary to a conical flange on the endform 52 for positively attaching the spool 50 to the conduit or brake line 14. By example, the end 74 of the spool 50 is rolled over the end of the tube 14 to form a tight, metal-to-metal seal between the tube 14 and the spool 50.

A circumferential recess 60 is formed in the exterior surface of the spool 50 generally intermediate the opposed ends of the spool 50. The recess 60 provides a surface for mounting a sealing means 62 as shown in FIGS. 1 and 2. The sealing means 62 may be a conventional O-ring or multi-lip seal.

A radially outward projecting ledge 66 is positioned between the circumferential recess 60 and one end 70 of the spool 50. The ledge 66 is adapted for mounting against the shoulder 30 in the housing 20 to seat the spool 50 in the housing 20.

A generally linear or cylindrical end portion 68 extends from the ledge 66 to the first end 70 of the spool 50. An annular groove 72 is formed adjacent to the first end 70 for receiving one end of a retainer as described hereafter.

Figure 3:
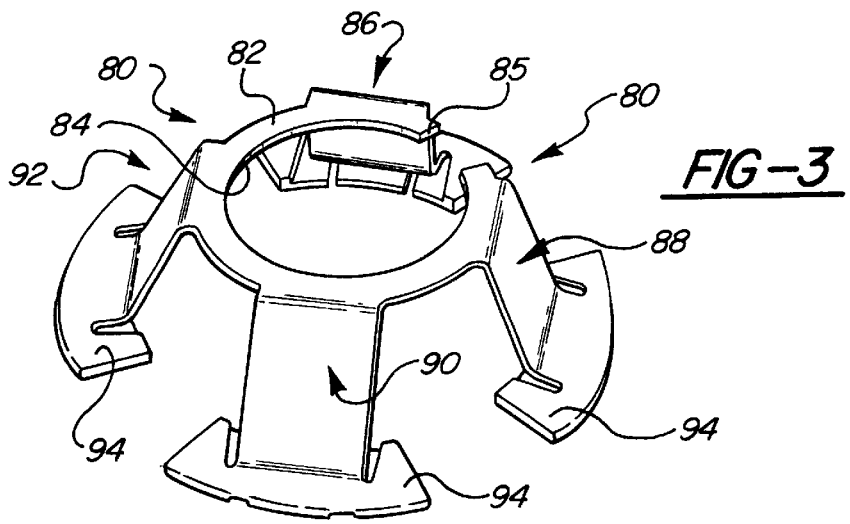
FIG. 3 is an enlarged, perspective view of one embodiment of a retainer according to the present invention.

As shown in FIGS. 1 and 2, and in greater detail in FIGS. 3 and 6, a first embodiment of the retainer 80 is formed of a single, unitary body constructed of a metal, such as a spring steel stamping.

The retainer 80 includes a generally flat, circular ring or end member 82 having a central aperture 84 sized to fit in the recess 72 on the spool 50 to mount the retainer 80 on the spool 50. A split or discontinuity 85 is formed in the ring member 82 to allow the ring member 82 to be mounted on the spool 50.

At least one and, preferably, two or more legs extend angularly and radially outward extending from the peripheral edge of the ring member 82 and are circumferentially spaced, preferably equal distantly, about the circumference of the ring member 82. In the first embodiment shown in FIG. 3, four substantially identical legs 86, 88, 90 and 92 are unitarily formed with the ring member 82 and extend both angularly and radially outward therefrom away from the plane of the ring member 82 and radially outward from the external periphery of the ring member 82. Thus, each of the legs 86, 88, 90 and 92, such as leg 88, movably project the ring member 82 and terminate in an end pad 94. The end pad 94 in each leg 86, 88, 90 and 92 is formed of a folded over member having a generally arcuate shape. Opposed ends of each end pad 94 are spaced from the adjacent ends of the end pads 94 on adjacent legs as shown in FIG. 3.

Since the retainer 80 is formed of a one-piece steel stamping, the angular disposition of the legs 86, 88, 90 and 92 provides each leg 86, 88, 90 and 92 with a degree of resiliency which allows the end pads 94 to be capable of movement radially inward and outward with respect to the ring member 82.

Figure 4:
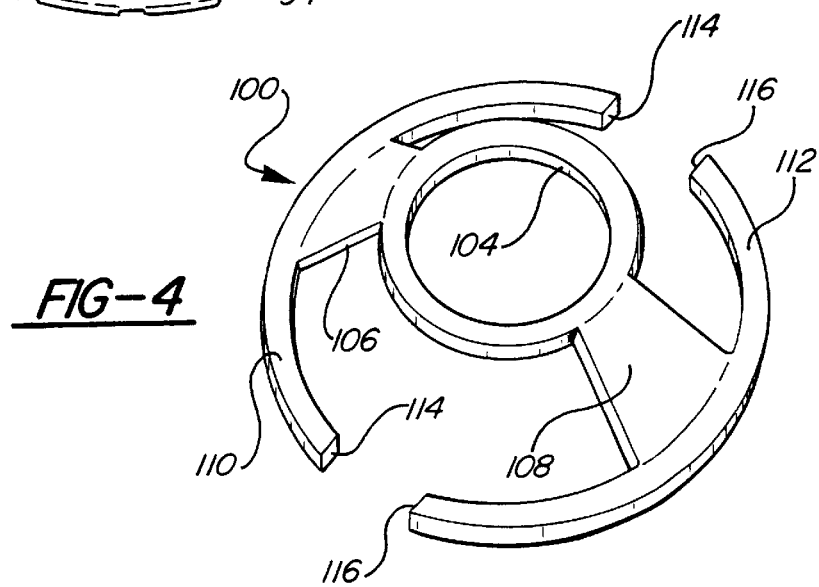
FIG. 4 is an enlarged, perspective view of another embodiment of a retainer according to the present invention.

A second embodiment of a retainer 100 is shown in FIG. 4. The retainer 100, like the retainer 80 described above, includes a ring or end member 102 having central aperture 104. The ring 102 is mountable over the spool 50 in the recess 72 adjacent the first end 70 of the spool 50.

In this embodiment, two legs 106 and 108 project angularly and radially outward from the periphery of the ring 102. Each of the legs 106 and 108 unitarily terminates in an arcuate shaped, flat, end pad 110 and 112, respectively. The end pads 110 and 112, by example, define generally arcuate members which extend over an arcuate length less than 180° such that the opposed end 114 of the end pad 110 are arcuate spaced from the opposite facing ends 116 of the end pad 112 of course, the end pads 110 and 112 may have other shapes, such as a small pad having the same width as the legs 106 and 108. The end pads 110 and 112 are also sized in thickness to resiliently fit within groove 32 in the body 20 of the housing 14 as described hereafter.

The following description of the insertion of the retainer 80 or 100 into the housing 20 and over the spool 50 will be described solely for the retainer 80. It will be understood that an identical mounting or insertion operation occurs for the retainer 100.

As shown in FIG. 1, with the seal means 62 mounted in the recess 60, the spool 50 is inserted over the tube 14 and slid into engagement with the endform 52. In the engaged position, the conical surface on the endform 52 engages the conical surface 56 on the spool 50. The end 74 of the spool 50 is then rolled over the endform 52 to join the spool 50 to the tube 14.

The ring member 82 of the retainer 80 is then seated in the recess 72 adjacent the first end 70 of the spool 50. The end of the spool SO is inserted through the end bore portion 34 in the housing 20 until the end pads 94 of the retainer 80 engage or are adjacent to the first end 36 of the housing 20.

A cylindrical pop top or insertion member 120 is mounted over the tube 14 and is formed with a first end bore 122 and a second enlarged retainer leg engaging bore 126. The first end bore 122 is sized to fit over the outer diameter of the tube 14 as shown in FIGS. 1 and 2. The retainer leg engaging bore 126 forms an internal surface which simultaneously engages all of the legs 86, 88, 90 and 92 of the retainer 80.

In use, the pop top 120 is urged co-axially toward the housing 20, as shown in FIG. 2, to bring the inner surface of the bore 126 into engagement with each of the legs 86, 88, 90 and 92 of the retainer 80. Further co-axial inward force on the pop top 120 toward the housing 20 exerts a radially inward force on each of the legs 86, 88, 90 and 92 of the retainer 80 moving the end pads 94 of each of the legs 86, 88, 90 and 92 radially inward toward the cylindrical end portion 68 of the spool 50. The end pads 94 are moved radially inward a sufficient distance to clear the inner diameter of the end bore portion 34 of the housing 20.

Continued co-axial force on the pop top 120 urges the retainer 80 and the spool 50 into the end bore portion 34 of the housing 20 until the ledge 66 on the spool 50 engages the shoulder 30. Inward force on the pop top 120 is then discontinued which allows the pop top 120 to move co-axially outward from the housing 20 releasing the inward radial force on each of the retainer legs 86, 88, 90 and 92. The resilient nature of each of the retainers legs 86, 88, 90 and 92 causes the legs 86, 88, 90 and 92 to then move radially outward from the ring member 82 bringing the end pads 94 on each of the legs 86, 88, 90 and 92 firmly into engagement with the groove 32 in the housing 20 to lock the retainer 80 in the housing 20. This locked engagement of the retainer 80 with the housing 20 also securely locks the spool 50 and the tube 14 in the housing 20.

The pop top 120 may be left disposed about the tube 14 or broken off by means of a thin frangible portion, not shown, formed in the pop top 120 to enable the pop top 120 to be removed completely from the tube 14.

As one main advantage of the retainer 80 or 100 is ease of assembly in the housing 20, the retainer leg end pads 94 can be easily urged into the groove 32 in the housing 20.

This overcomes the inherent reliability problems encountered with previously used snap rings for locking a tube and spool in the bore of the female connector housing.

According to the present invention, assurance means is provided for assuring that the end pads 94 of the legs 86, 88, 90 and 92 of the retainer 80 remain pushed into the groove 32 in the housing 20 to fixedly retain the spool 50 and tube 14 in the housing 20. The assurance means is in the form of a clip 130 shown in detail in FIGS. 5 and 6. The clip 130 is the form of a U-shaped member formed of a suitable spring metal or resilient plastic.

Figure 5:
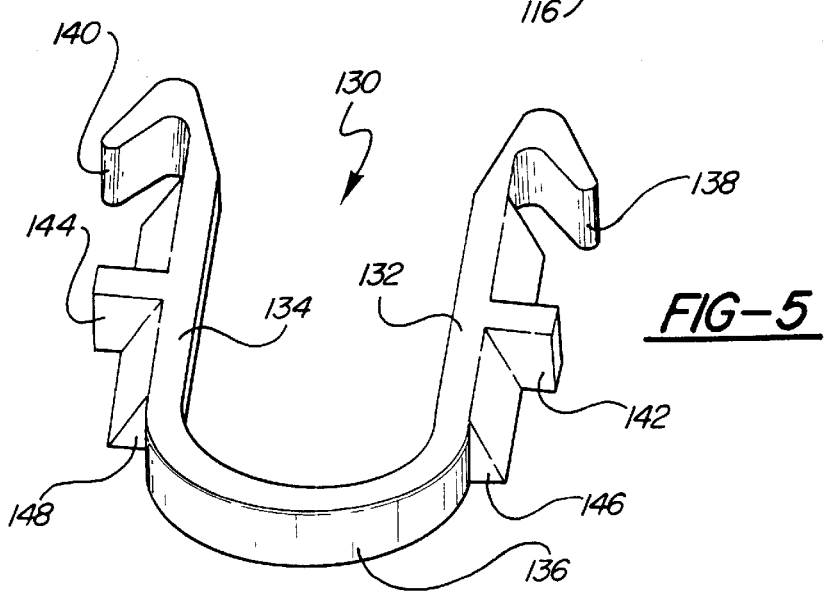
FIG. 5 is an enlarged, perspective view of an assurance clip according to the present invention.

The clip 130, includes two spaced legs 132 and 134 which are integrally and unitarily joined at one end by a central end portion 136. Each of the legs 132 and 134 has a generally linear extent and terminates at one end, opposed from the central end portion 136 in upturned hooks 138 and 140, respectively. A pair of flanges 142 and 144 disposed intermediately between the ends of the legs 132 and 134 and project outward from the legs 132 and 134 as shown in FIG. 5. The flanges 142 and 144 cooperate with the hooks 138 and 140 to trap the clip 130 about the two of the legs 86, 88, 90 or 92 of the retainer 80 as described hereafter.

Ramp members 146 and 148, typically in the form of angled bosses, are unitarily formed on the legs 132 and 134 and extend angularly outward from the outer surface of the legs 132 and 134 to one edge surface of the clip 130. The ramp members 146 and 148 follow the angular position of the adjacent legs of the retainer 80 and fill substantially all of the space between the retainer legs and the spool 50.

In assembling the clip 130, after the retainer 80 has been firmly seated into the channel or groove 32 in the housing 20, as shown in FIG. 1, the legs 132 and 134 of the clip 130 are inserted to two opposed legs, such as legs 86, and 90 or 88 and 92 of the retainer 80 as shown in FIG. 6. There is sufficient space between the cylindrical end portion 68 of the spool 50 and the opposed inner surface of the legs 86 and 90 or 88 and 92 to enable the hooks 138 and 140 on the end of the legs 132 and 134 to be bent radially inward toward the opposed leg to enable the hooks 138 and 140 to be inserted between the spool 50 and one leg of the retainer 80. The legs 132 and 134 are inserted a sufficient distance to enable the hooks 138 and 140 to extend outwardly beyond the opposite side edge of the legs 86 and 90 or 88 and 92. In this position, the hooks 138 and 140 prevent the clip 130 from accidental disengagement from the retainer 80. In addition, the intermediate flanges 142 and 144 are disposed adjacent the opposite side edges of the legs 88 and 92 to trap the clip 130 about the legs 88 and 92 and limit further insertion of the clip 130 into the retainer 80.

Once the force urging the hook ends 138 and 140 of the legs 132 and 134 inward is released, the resilient nature of the legs 132 and 143 enables the legs to be resiliently biased outward into engagement with the adjacent retainer leg and provide sufficient force to maintain the end pads 94 on the legs 88 and 92 seated within the groove 32 in the housing 20. This assures that the retainer 80 is firmly locked in place in the housing 20.

Further, the disposition of the legs 132 and 134 of clip 130 between the legs 88 and 92 of the retainer 80 and the adjacent cylindrical end portion 68 of the spool 50 prevents radially inward movement of the legs 88 and 92 to a sufficient distance which would enable disengagement of the end pads 94 from the groove 32. This again assures that the end pads 94 on each leg 88 and 92 of the retainer 80 as well as the diametrically opposed pair legs 86 and 90 remain seated within the groove 32 in the housing 20.

In summary, there has been disclosed a unique quick connector which includes a uniquely constructed retainer which provides ease of assembly of the retainer into female connector housing. In addition, a unique assurance clip is provided to ensure that the end pads on the retainer legs remain seated within the annular mounting groove of the female connector housing to keep the retainer in secure engagement with the housing thereby maintaining a fluid tube carried by a spool on which the retainer is mounted firmly in position within the female connector housing.

What is claimed is:

1. A quick connector for use with a tube comprising:

a first connector having a housing with a bore extending therethrough and an annular inward facing channel spaced from one end of the housing and opening to the bore;

a second connector including a spool having a bore extending therethrough adapted for carrying a tube;

a retainer having an aperture in an end portion for receiving the tube therethrough and a plurality of legs movably extending from the end portion, the legs having radially outward extending end portions mountable in latching engagement in the channel in the housing to lockingly couple the spool in sealing engagement with the first connector; and means, mounted on the retainer during insertion of the retainer into the housing, for maintaining the retainer legs in a radially inward position allowing free passage of the end portions of the legs into the bore in the first connector housing, the maintaining means moving, relative to the retainer, upon engagement with the housing for allowing the retainer legs to move to a radially outward expanded position wherein the end portions of the retainer legs engage the channel in the housing to lock the second connector in the first connector.

2. The quick connector of claim 1 wherein:

the end portions of the legs include planar ends engagable with the channel.

3. The quick connector of claim 2 wherein:

the planar end of each leg extends outward from side edges of each leg.

4. The quick connector of claim 2 wherein:

the legs extend radially outward from the end portion to the planar ends.

5. The quick connector of claim 4 wherein:

the outer ends of the legs are at a nominal diameter greater than the inner diameter of the bore in the housing.

6. The quick connector of claim 4 wherein the plurality of legs comprises at least two legs.

7. The quick connector of claim 1 wherein:

the legs have end pads engageable with the channel in the housing, the end pads having an arcuate shape.

8. The quick connector of claim 7 wherein:

an end of each end pad is spaced from ends of adjacent circumferentially spaced end pads.

9. A quick connector for use with a tube comprising:

a first connector having a housing with a bore extending therethrough and an annular inward facing channel spaced from one end of the housing and opening to the bore;

a second connector including a spool having a bore extending therethrough adapted for carrying a tube;

a retainer having an end with an aperture for receiving the spool therethrough, the aperture defining a spool engagement surface for fixedly mounting the retainer to the spool, and a plurality of legs movably extending from the end for latching engagement in the channel in the housing to lockingly couple the spool in sealing engagement with the first connector, the end disposed exteriorly of the housing when the legs are latchingly engaged in the channel in the housing; and means, mountable between the legs and the end of the retainer disposed exteriorly of the housing after the retainer has been coupled to the housing and in engagement with the legs extending from the end portion, for maintaining the legs of the retainer in the radially outward expanded position in engagement with the channel.

10. A quick connector for use with a tube comprising:

a first connector having a housing with a bore extending therethrough and an annular inward facing channel spaced from one end of the housing and opening to the bore;

a second connector including a spool having a bore extending therethrough adapted for carrying a tube;

a retainer having an aperture in an end portion for receiving the tube therethrough and a plurality of legs movably extending from the end portion, the legs having radially outward extending end portions mountable in latching engagement in the channel in the housing to lockingly couple the spool in sealing engagement with the first connector; and means, mounted on the retainer during insertion of the retainer into the housing, for maintaining the retainer legs in a radially inward position allowing free passage of the end portions of the legs into the bore in the first connector housing, the maintaining means moving, relative to the retainer, upon engagement with the housing for allowing the retainer legs to move to a radially outward expanded position wherein the end portions of the retainer legs engage the channel in the housing to lock the second connector in the first connector, the maintaining means including a clip insertable between the legs of the retainer and the spool for preventing radially inward movement of the legs.

11. The quick connector of claim 10 wherein the clip comprises:

spaced legs joined by at an end wall, each leg insertable through two aligned openings in the retainer formed between the legs of the retainer and the spool.

12. The quick connector of claim 11 further comprising:

oppositely extending hooks formed at the ends of each of the two spaced legs and engagable with the legs of the retainer after the clip has been mounted in the end portion of the retainer to prevent disengagement of the clip from the retainer.

13. The quick connector of claim 11 further comprising:

means, formed on the clip means, for limiting the insertion distance of the clip means into the retainer.

14. The quick connector of claim 13 wherein the limiting means comprises:

a flange on each leg spaced from a free end of each leg, the flange engagable with the legs of the retainer.

15. A retainer element for locking a spool carrying a tube in sealing engagement in a bore in a connector housing, the connector housing having inward opening channel communicating with the bore, the retainer element comprising:

an end portion having an aperture for receiving the spool therethrough along a longitudinal axis extending through the aperture, the aperture defining a spool engagement surface adapted for fixedly mounting the retainer to the spool;

a plurality of legs extending from the end portion, the legs having outer end flanges; and the outer end flanges of the legs engagable with the channel in the connector housing, the outer end flanges and the spool engagement surface of the retainer co-acting with the housing to latch a spool in the housing.

16. The retainer element of claim 15 further comprising:

the end portion engagable with the spool.

17. The retainer element of claim 15 wherein:

the outer end flanges of the legs are planar.

18. The retainer element of claim 17 wherein:

the outer end flange of each leg extends laterally outward from side edges of each leg.

19. The retainer element of claim 15 wherein:

the outer ends of the legs are at a nominal diameter greater than an inner diameter of the bore in the housing.

20. The retainer element of claim 16 wherein:

the outer ends of the legs form end pads engagable with the channel in the housing, the end pads having an arcuate shape.

21. The retainer element of claim 15 wherein:

the outer end flanges of the legs form end pads engagable with the channel in the housing, the end pads having an arcuate shape.

22. The retainer element of claim 21 wherein:

the end of each end pad is spaced from the ends of adjacent circumferentially spaced end pads.

* * * * *